US009677715B2

(12) United States Patent
Roberge

(10) Patent No.: US 9,677,715 B2
(45) Date of Patent: Jun. 13, 2017

(54) RESIDUAL PRESSURE VALVE DEVICE, VALVE AND CYLINDER HAVING SUCH A DEVICE

(71) Applicant: L'Air Liquide, Société Anonyme pour l'Etude et l'Exploitation des Procédés Georges Claude, Paris (FR)

(72) Inventor: Guillaume Roberge, Maubec (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 71 days.

(21) Appl. No.: 14/433,266

(22) PCT Filed: Oct. 1, 2013

(86) PCT No.: PCT/FR2013/052334
§ 371 (c)(1),
(2) Date: Apr. 2, 2015

(87) PCT Pub. No.: WO2014/053764
PCT Pub. Date: Apr. 10, 2014

(65) Prior Publication Data

US 2015/0276132 A1 Oct. 1, 2015

(30) Foreign Application Priority Data

Oct. 2, 2012 (FR) ..................................... 12 59299

(51) Int. Cl.
*F16K 31/12* (2006.01)
*F17C 13/04* (2006.01)

(52) U.S. Cl.
CPC ...... *F17C 13/04* (2013.01); *F17C 2205/0323* (2013.01); *F17C 2205/0338* (2013.01);
(Continued)

(58) Field of Classification Search
CPC ...... F17C 2205/0323; F17C 2205/0382; F17C 2205/0394; F17C 2205/0338;
(Continued)

(56) References Cited

U.S. PATENT DOCUMENTS 1,863,454 A * 6/1932 Rowley ................ A62C 35/645 137/492.5
3,311,124 A * 3/1967 Le Gates ................ F01D 21/02 137/110
(Continued)

FOREIGN PATENT DOCUMENTS

DE 21 31 805 12/1972
DE 32 22 041 12/1983
(Continued)

OTHER PUBLICATIONS

French Search Report and Written Opinion for corresponding FR 1259299, Sep. 11, 2013.
(Continued)

*Primary Examiner* — Jessica Cahill
(74) *Attorney, Agent, or Firm* — Elwood L. Haynes

(57) ABSTRACT

The invention relates to a residual pressure valve device comprising a shut-off member (1) that is able to move in the body (9) relative to a seat (2), a return member (5) that urges the shut-off member (1) by default towards the seat (2), the shut-off member (1) comprising an internal duct (6) having a first end in communication with the gas inlet (3) and a second end that leads, via a calibrated orifice (8), into a control chamber (7) that is closed by the shut-off member (1) such that, when the gas pressure in the control chamber (7) reaches a predetermined threshold, this pressure causes the shut-off member (1) to move away from the seat (2), the body of the shut-off member (1) comprising a first portion (11) that forms a male element which is able to move in translation in a female passage of the body (9) with a
(Continued)

predetermined fit forming a restriction ensuring partial and progressive opening of the passage for the gas between the inlet (3) and the outlet (4).

7 Claims, 2 Drawing Sheets

(52) U.S. Cl.
CPC ................. *F17C 2205/0382* (2013.01); *F17C 2205/0394* (2013.01); *F17C 2223/0123* (2013.01); *F17C 2223/036* (2013.01); *F17C 2227/048* (2013.01); *Y10T 137/7758* (2015.04)

(58) Field of Classification Search
CPC ........... F17C 2227/048; Y10T 137/778; Y10T 137/7784; Y10T 137/7826; Y10T 137/7769; Y10T 137/7762; Y10T 137/777; Y10T 137/7758
USPC ................................. 137/491, 469, 462, 467
See application file for complete search history.

(56) References Cited

U.S. PATENT DOCUMENTS

| | | | | | |
|---|---|---|---|---|---|
| 3,400,734 | A * | 9/1968 | Rosenberg | F16K 3/314 | 137/460 |
| 3,604,446 | A * | 9/1971 | Brooks | F16K 17/105 | 137/115.03 |
| 3,613,715 | A * | 10/1971 | Johnson | F16K 17/105 | 137/269 |
| 3,613,716 | A * | 10/1971 | Hoheisel | F16K 17/105 | 137/491 |
| 3,995,656 | A * | 12/1976 | Mills, Jr. | G05D 7/012 | 137/497 |
| 4,112,704 | A * | 9/1978 | Kaneko | F25B 41/043 | 137/491 |
| 5,234,026 | A * | 8/1993 | Patterson | G05D 16/10 | 137/375 |
| 5,400,817 | A * | 3/1995 | Voss | F16K 17/046 | 137/491 |
| 7,766,030 | B2 * | 8/2010 | Askew | F15B 5/006 | 137/485 |
| 8,757,583 | B2 * | 6/2014 | Stein | F04B 7/0076 | 251/30.04 |
| 2004/0089347 | A1 * | 5/2004 | Cavagna | F16K 17/10 | 137/491 |

FOREIGN PATENT DOCUMENTS

| | | |
|---|---|---|
| DE | 197 09 096 | 10/1998 |
| DE | 101 37 361 | 1/2003 |
| GB | 2 028 974 | 3/1980 |

OTHER PUBLICATIONS

International Search Report and Written Opinion for corresponding PCT/FR2013/052334, Nov. 21, 2013.

* cited by examiner

RESIDUAL PRESSURE VALVE DEVICE, VALVE AND CYLINDER HAVING SUCH A DEVICE

CROSS REFERENCE TO RELATED APPLICATIONS

This application is a 371 of International PCT Application PCT/FR2013052334 filed Oct. 1, 2013, which claims priority to French Patent Application No. 1259299 filed Oct. 2, 2012, the entire contents of which are incorporated herein by reference.

BACKGROUND

The present invention relates to a residual pressure valve device as well as to a valve and a gas cylinder comprising such a device.

Residual pressure valve devices are provided to avoid a pressurized gas cylinder being totally drained. Said devices are general arranged upstream of a pressure regulator (upstream in the sense of gas withdrawal).

However, such devices create load losses on the gas tapping circuit. Known devices generate a load loss equal to the pressure setting of the residual pressure valve. As a result, taking into consideration the characteristics of the pressure regulator downstream (flow rate/pressure), the tapping flow rate can only be supplied up to the pressure setting of the residual pressure valve but said flow rate drops rapidly when approaching the pressure setting of the valve. For example, for a residual pressure valve device preset to 20 bar, the tapping rate and the outlet pressure of a regulator downstream drop from 35 to 40 bar.

In addition, when a shut-off valve upstream of such a device is opened, the inlet of a high-pressure gas flow can generate a phenomenon called a "water hammer", that is to say an overpressure due to a sudden variation in the pressure and speed of the gas.

SUMMARY

One object of the present invention is to remedy all or part of the disadvantages of the prior art provided above.

To this end, the residual pressure valve device comprises a body, a shut-off member that is movable in the body in relation to a seat in order in a selective manner to permit or interrupt a flow of gas between a fluid inlet and a fluid outlet, a return member which, by default, urges the shut-off member toward the seat toward its position interrupting the flow, the shut-off member comprising an internal duct having a first end which communicates with the gas inlet and a second end which opens out, via a calibrated aperture, into a pilot chamber, the pilot chamber being reclosed in a tight manner by a downstream end of the shut-off member such that, when the gas pressure in the pilot chamber reaches a specified threshold, said pressure induces a displacement force of the shut-off member in opposition to the force of the return member in order to move the shut-off member away from the seat and thus to permit a gas flow between the fluid inlet and the fluid outlet, the body of the shut-off member comprising, between the seat and the downstream end of the shut-off member, a first portion which forms a male element which can be moved in translation in a female passage of the body with a specified fit forming a restriction which ensures a partial, progressive opening in the passage for the gas between the inlet and the outlet.

Moreover, embodiments of the invention can include one or several of the following characteristics:

between the first portion and the downstream end of the shut-off member, the body of the shut-off member comprises a second portion with a reduced section in relation to the section of the first portion, in order to form an enlarged passage defining an opening for the gas between the inlet and the outlet, the dimensions of the opening which is delimited by the seat differ by more than 30% in relation to the dimensions of the section of the first portion of the shut-off member, the opening which is delimited by the seat is circular and has a diameter of between three and six millimeters inclusive and differs by more than 1 mm in relation to the diameter of the first portion of the shut-off member which is cylindrical, the first portion is cylindrical with a specified diameter and the female passage of the body is a cylindrical bore with a diameter specified so as to form a standard or precise clearance between the shut-off member and the female passage of the body, for example an H8 f7 type clearance according to the ISO standard for clearance fits, the shut-off member can be moved in translation in the body along an upstream/downstream direction, the first portion has a length along the upstream/downstream direction of between two and eight millimeters inclusive and in a preferred manner of between three and four millimeters inclusive, the calibrated aperture has a diameter of between 0.01 mm and 0.05 mm inclusive and in a preferred manner of between 0.10 mm and 0.30 mm inclusive in order to control the speed of pressure build-up in the pilot chamber, said speed of pressure build-up being a function moreover of the gas pressure at the inlet (3) and of the volume of said pilot chamber, the opening which is delimited by the seat is circular and has a diameter of 4.3 mm, the first portion is cylindrical and has a diameter of 4.3 mm, the female passage of the body is a cylindrical bore with a length of between 3 and 4 mm inclusive and a diameter which is specified to form an H8 f7 type clearance fit with the first portion, the calibrated aperture having a diameter of between 0.08 mm and 0.12 mm inclusive and the return member being a spring which exerts a force of between 20 and 100 newtons inclusive on the shut-off member.

The invention also relates to any alternative device or method which comprises any combination of the characteristics above or below.

The invention also relates to a valve of a pressurized gas cylinder, comprising a tapping circuit having an upstream end which is intended to be connected to a storage volume of a pressurized gas cylinder and a downstream end which is intended to be connected to a device consuming gas withdrawn from the cylinder, the tapping circuit comprising a shut-off valve and a residual pressure valve device, arranged in series upstream between the upstream end and the downstream end, in which the residual pressure valve device complies with any one of the characteristics above or below.

The invention also relates to a pressurized gas cylinder which comprises such a valve.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
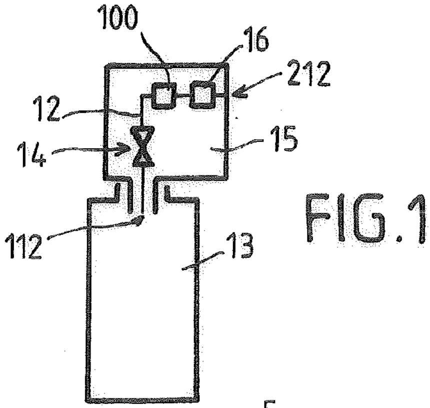
FIG. 1 shows a side view of a schematic and partial representation showing an example of a pressurized gas cylinder provided with a valve which allows the invention to be implemented.
Figure 2:
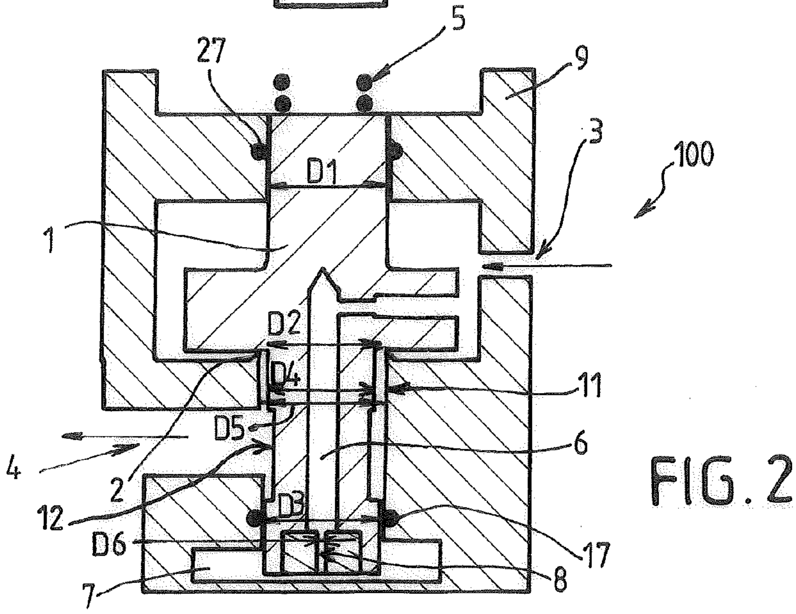
FIG. 2 shows a sectional view of a schematic and partial representation showing the structure of an example of a residual pressure valve device in a first closed configuration.

The residual pressure valve device 100 shown in the figures comprises a body 9 which houses a movable shut-off member 1. More precisely, the shut-off member 1 can be moved in translation in relation to a seat 2 in order, in a selective manner, to close or open a gas passage between a fluid inlet 3 and a fluid outlet 4.

The inlet 3 is connected, for example, to the outlet via a shut-off valve 14 which is situated upstream in a tapping circuit 12 of a valve 15 of a pressurized gas cylinder 13 (cf. FIG. 1). The fluid outlet 4 is connected, for example, to a pressure regulator 16 which is situated downstream in the tapping circuit 12 and which is configured in order to ensure reduction in the gas pressure at a specified value. For example, the tapping circuit 12 comprises to this end an upstream end 112 which is connected to the storage volume of the cylinder 13 and a downstream end 212 which is intended to be connected in a selective manner to a device consuming gas withdrawn from the cylinder 13.

The device 100 comprises a return member 5 which urges, by default, the shut-off member 1 toward the seat 2 (from an upstream direction to a downstream direction).

In addition, the shut-off member 1 comprises an internal duct 6 which has a first end which communicates with the gas inlet 3 and a second end which opens out, via a calibrated aperture 8, into a pilot chamber 7 which is formed in the body 9. The pilot chamber 7 is reclosed in a tight manner at one end by a downstream end of the shut-off member 1 (for example by a seal 17, notably an O-ring seal). In this way the volume of the pilot chamber 7 varies according to the position of the shut-off member 1 in relation to the seat 2. The internal duct 6 allows the high-pressure gas, which arrives by means of the inlet 3 (for example when the valve 14 upstream is opened), to be routed into the pilot chamber 7. When the gas pressure in the pilot chamber 7 reaches a specified threshold, said pressure induces a sufficient displacement force on the shut-off member 1 from the downstream direction toward the upstream direction in order to move it away from the seat 2. This therefore permits a gas flow between the fluid inlet 3 and the fluid outlet 4.

This architecture of internal duct and pilot chamber 7 forms a mechanism which requires a sufficient gas pressure upstream to open the valve (that is to say a residual pressure valve mechanism).

Figure 3:
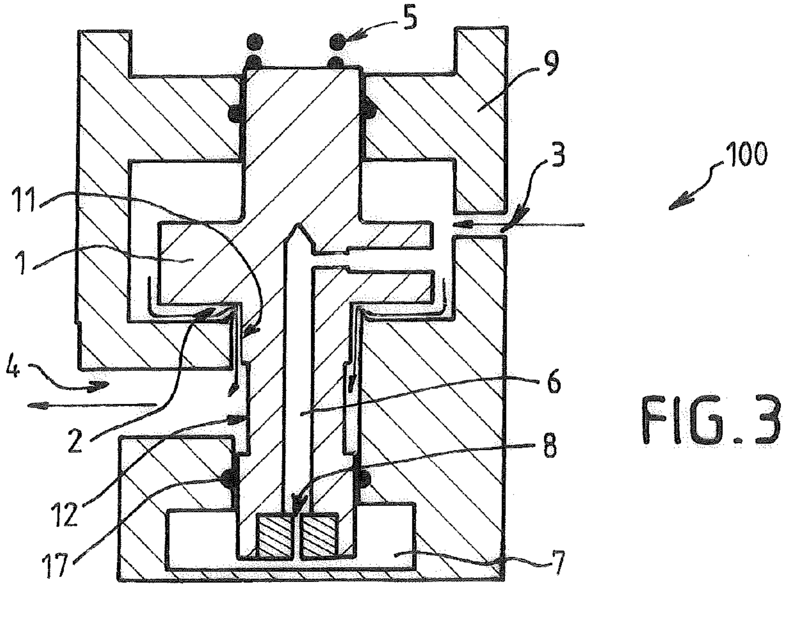
FIGS. 3 and 4 show the residual pressure valve device of FIG. 2 according to two distinct partially open configurations respectively.
Figure 4:
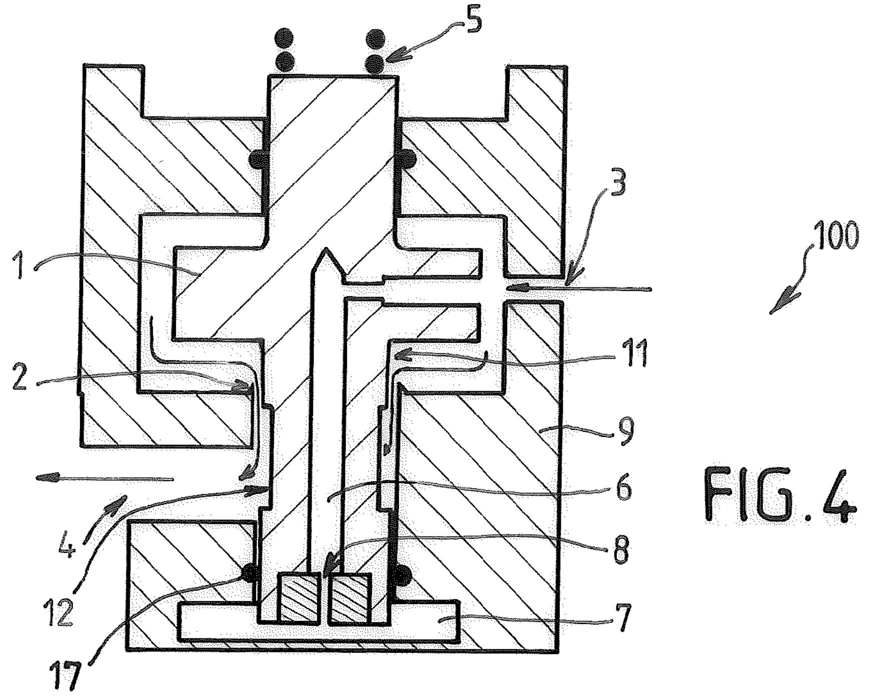

In addition, the body of the shut-off member 1 comprises, between its part which cooperates in a selective manner with the seat 2 and the downstream end of the shut-off member 1, a first portion 11 which forms a male element which can be moved in translation in a female passage of the body 9 with a specified tolerance fit which forms a restriction which ensures a partial and progressive opening of the opening for the gas between the inlet 3 and the outlet 4 (cf. FIGS. 3 and 4).

For example, the first portion 11 is cylindrical and has a specified diameter D4 whilst the female passage of the body 9 which receives it is a cylindrical bore with a diameter D5 which is specified so as to form a standard, slim or exact clearance, for example of the H8 f7 type according to the ISO standard for clearance fits.

Thus, when a valve 14 upstream is opened, the pressure arrives at the inlet 3 then passes into the pilot chamber 7. The pressure increases progressively in the pilot chamber 7. Said speed of pressure build-up depends notably on the pressure upstream at the inlet 3 upstream, on the volume of the pilot chamber 7 and on the section or diameter D6 of the calibrated aperture 8.

When the pressure in said pilot chamber 7 reaches the specified opening pressure threshold, the shut-off member 1 is moved away from its seat 2 and opens a gas passage between the first portion 11 of the shut-off member and the body 9. In a preferred manner, the diameter D2 of the opening which is delimited by the seat 2 is equal or very close to the section (diameter D5) of the female passage of the body 9.

The small amount of play between the first portion 11 of the shut-off member and the body 9 ensures a progressive passage of gas and a progressive opening (cf. the gas path symbolized by the arrows in FIGS. 3 and 4).

The pressure build-up downstream of the shut-off member 1 is all the more progressive given that the shut-off member 1 has great inertia and the throttling at the clearance fit is realized along a large path along the shut-off member 1 (for example, the length of the first portion is between 2 and 6 mm inclusive).

Figure 5:
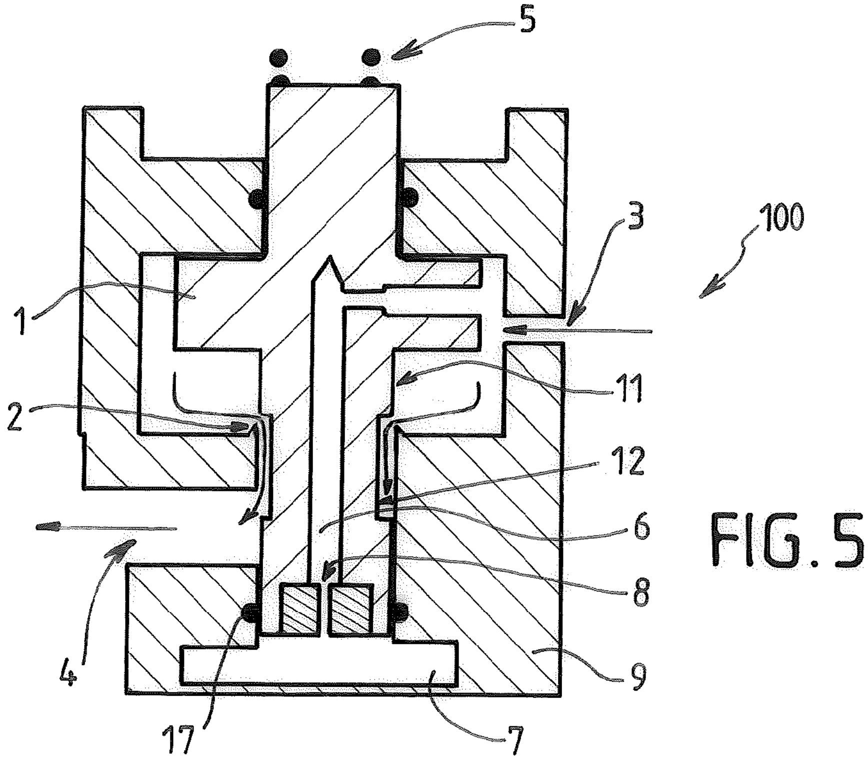
FIG. 5 shows the device of FIG. 2 according to a totally open configuration.

The shut-off member 1 continues its path in opposition to the spring 5 until a second portion 12 of the shut-off member arrives at the passage in the body 9. Said second portion 12 has a section that is more reduced than the first portion and allows a broader passage of gas (cf. FIG. 5). The section of passage between the body 9 and the second portion 12 (corresponding to a state where the valve is open) is chosen such that the load loss generated by the passage of gas is negligible, typically said section is at least equivalent to the passage section of the valve 14 which is situated upstream in the circuit 12.

Such an architecture has advantages in relation to the prior art. Indeed, the device allows a flow rate and an output pressure to be maintained up to the set threshold of the residual pressure valve device without creating any parasitic load loss as is the case in conventional residual pressure valves (RPV).

Indeed, the device does not limit the withdrawal of gas from the cylinder beyond its set pressure.

In addition, said device has an architecture which does not confine pressurized gas in its mechanism which can cause deterioration or make it compulsory to utilize specific sealing means (via plastomers for example). Indeed, the structure of the device avoids trapping high-pressure gas downstream of the residual pressure valve as is the case conventionally in the prior art. Indeed, when the pressurized gas is trapped in the valve, this generates large stresses, notably at the sealing means at the seat. This can lead to destruction of the sealing means.

As a result of the low forces generated at the sealing means between the shut-off member 1 and the seat 2, the geometry of the device allows elastomers to be used (typically O-ring seals 17, 27) which thus allow very good levels of sealing to be obtained in contrast to the sealing means with plastic material (such as, for example, PEEK®, TORLON® or TEFLON®).

The device integrates both a function of retaining a residual pressure and a device for progressive opening which reduces or eliminates shocks such as "water hammers".

Indeed, the device allows the sudden pressure build-up due to a rapid opening of a shut-off valve 14 upstream to be absorbed.

In a non-restricting embodiment, the upstream end of the shut-off member 1 has a diameter D1 for example of between 4 and 5 mm inclusive, for example 4.3 mm. The diameter D2 of the seat is equal, for example, to 4.3 mm as is the diameter D3 of the bottom end of the shut-off member 1. The diameter D4 of the first portion 11 of the shut-off member 1 is equal, for example to 4.3 mm. The diameter D5 of the bore which forms the passage for the shut-off member 1 is itself specified in relation to the diameter of the first portion 11 according to the clearance fit desired (for example H8,f7). The diameter D6 of the calibrated aperture is, for example, equal to 0.1 mm and the force of the return spring 5 is, for example, 30 newtons.

For said non-restricting example, in the case of a gas pressure at the input 3 which is equal to 800 bar, the opening of the passage is obtained when the pressure in the pilot chamber 7 reaches approximately 90 bar. For a pressure at the inlet of 25 bar, the valve is opened when the pressure in the pilot chamber 7 reaches approximately 22 bar. The shut-off member 1 recloses the passage again by pressing against the seat 2 at the end of the withdrawal process, at a pressure at the inlet of approximately 21 bar.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A residual pressure valve device comprising:

a body, a shut-off member that is movable in the body in relation to a seat in order in a selective manner to permit or interrupt a flow of gas between a fluid inlet and a fluid outlet, a return member which, by default, urges the shut-off member toward the seat toward its position interrupting the flow, the shut-off member comprising an internal duct having a first end which communicates with the gas inlet and a second end which opens out, via a calibrated aperture, into a pilot chamber, the pilot chamber being reclosed in a tight manner by a downstream end of the shut-off member such that, when the gas pressure in the pilot chamber reaches a specified threshold, said pressure induces a displacement force of the shut-off member in opposition to the force of the return member in order to move the shut-off member away from the seat and thus to permit a gas flow between the fluid inlet and the fluid outlet, the body of the shut-off member comprising, between the seat and the downstream end of the shut-off member, a first portion which forms a male element which can be moved in translation in a female passage of the body with a specified fit forming a restriction which ensures a partial, progressive opening of the passage for the gas between the inlet and the outlet, wherein the first portion has an outside diameter, wherein between the first portion and the downstream end of the shut-off member, the body of the shut-off member further comprises a second portion with a reduced outside diameter in relation to the outside diameter of the first portion, in order to form an enlarged passage defining an opening for the gas between the inlet and the outlet.

2. The device as of claim 1, wherein the dimensions of the opening which is delimited by the seat differ by more than 30% in relation to the dimensions of the outside diameter of the first portion of the shut-off member.

3. The device of claim 2, wherein the opening which is delimited by the seat is circular and has a diameter of between three and six millimeters inclusive and differs by more than 1 mm in relation to the diameter of the first portion of the shut-off member which is cylindrical.

4. The device of claim 1, wherein the shut-off member can be moved in translation in the body along an upstream/downstream direction, the first portion has a length along the upstream/downstream direction of between two and eight millimeters inclusive.

5. The device of claim 1, wherein the calibrated aperture has a diameter of between 0.01 mm and 0.50 mm in order to control the speed of pressure build-up in the pilot chamber, said speed of pressure build-up being a function moreover of the gas pressure at the inlet and of the volume of said pilot chamber.

6. A valve of a pressurized gas cylinder, comprising a tapping circuit having an upstream end which is intended to be connected to a storage volume of a pressurized gas cylinder and a downstream end which is intended to be connected to a device consuming gas withdrawn from the cylinder, the tapping circuit comprising a shut-off valve and a residual pressure valve device, arranged in series upstream between the upstream end and the downstream end, wherein the residual pressure valve device complies with claim 1.

7. A pressurized gas cylinder, wherein said cylinder comprises a valve as claimed in claim 6.

* * * * *